(12) United States Patent
Suzuki et al.

(10) Patent No.: US 8,814,269 B2
(45) Date of Patent: Aug. 26, 2014

(54) VEHICLE SEAT

(75) Inventors: Yuya Suzuki, Toyota (JP); Tomoyuki Takase, Miyoshi (JP); Shinya Ando, Miyoshi (JP); Michinori Kakumu, Toyota (JP); Keiichiro Inoue, Toyota (JP)

(73) Assignees: Toyota Boshoku Kabushiki Kaisha, Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 444 days.

(21) Appl. No.: 13/216,498

(22) Filed: Aug. 24, 2011

(65) Prior Publication Data

US 2012/0049587 A1 Mar. 1, 2012

(30) Foreign Application Priority Data

Aug. 26, 2010 (JP) ................. 2010-189364

(51) Int. Cl.
*A47C 3/00* (2006.01)
*A47C 7/46* (2006.01)

(52) U.S. Cl.
USPC ............... 297/284.4; 297/284.1; 297/DIG. 1; 297/216.13; 297/452.56; 297/284.11

(58) Field of Classification Search
USPC ............... 297/216.1, 216.14, 216.13, 216.16, 297/216.12, 284.4, 452.18, 452.56, 284.1, 297/284.3, 284.11, DIG. 1
See application file for complete search history.

(56) References Cited

U.S. PATENT DOCUMENTS

| | | | | |
|---|---|---|---|---|
| 5,716,098 A * | 2/1998 | Lance | | 297/284.4 |
| 6,655,745 B2 * | 12/2003 | Fohrenkamm et al. | | 297/481 |
| 6,688,700 B2 * | 2/2004 | Gupta et al. | | 297/452.18 |
| 6,719,368 B1 * | 4/2004 | Neale | | 297/216.14 |
| 7,971,939 B2 * | 7/2011 | Fujita et al. | | 297/452.56 |
| 7,984,945 B2 * | 7/2011 | Sayama | | 297/216.12 |
| 8,061,774 B2 * | 11/2011 | Omori et al. | | 297/284.4 |
| 8,162,392 B2 * | 4/2012 | Humer et al. | | 297/216.12 |
| 2010/0187876 A1 | 7/2010 | Nitsuma | | |

FOREIGN PATENT DOCUMENTS

| | | |
|---|---|---|
| JP | 2001-145538 | 5/2001 |
| JP | 2004-16708 | 1/2004 |
| JP | 2006-35964 | 2/2006 |
| JP | 2006-35965 | 2/2006 |
| JP | 2010-76633 | 4/2010 |
| JP | 2010-173618 | 8/2010 |

OTHER PUBLICATIONS

Japan Office action, dated Jul. 10, 2012 along with an english translation thereof.

* cited by examiner

*Primary Examiner* — Chi Q Nguyen
(74) *Attorney, Agent, or Firm* — Greenblum & Bernstein, P.L.C.

(57) ABSTRACT

A vehicle seat is provided. The vehicle seat includes a back frame, and a bracket assembled to the back frame and configured to reduce a load applied to a neck of an occupant by shock of a rear collision when the rear collision occurs in a vehicle, wherein the bracket has an inclined surface that is substantially parallel with a torso line at a normal posture of a seatback.

7 Claims, 5 Drawing Sheets

VEHICLE SEAT

BACKGROUND OF THE INVENTION

1. Field of the Invention

The present invention relates to a vehicle seat, and more particularly, to a vehicle seat having a back frame assembled with a bracket for reducing a load applied to the neck of an occupant due by shock resulting from a rear collision.

2. Description of the Related Art

There has been known a vehicle seat which can reduce a load to be applied to the neck of an occupant due to shock of a rear collision. For example, a vehicle seat 101 shown in FIG. 5 has a back frame (not shown) assembled with a bracket 130 for suppressing a sinking amount of a waist part of an occupant m into a seatback 103 when a rear collision occurs in a vehicle. Thereby, compared to a configuration where the bracket 130 is not assembled, it is possible to suppress a torso line t of the occupant m sinking into the seatback 103 from being tilted forward, i.e., it is possible to keep a state where the torso line t of the occupant m having sunk into the seatback 103 tilts backward (state shown in FIG. 5(B)). Accordingly, it is possible to suppress an angle (Δθa in FIG. 5(B)) by which a head of the occupant m having sunk into the seatback can be tilted backward. Thus, it is possible to reduce the load to be applied to the neck of the occupant m by the shock of the rear collision (see JP-A-2006-35965).

However, according to the vehicle seat 101 shown in FIG. 5, the bracket 130 is assembled to the back frame such that a surface of the bracket extends substantially vertical direction at a normal posture of the seatback 103 (a posture shown in FIG. 5(A)). When the bracket is assembled as described above, it is not possible to keep the torso line t of the occupant m having sunk into the seatback 103 to be sufficiently tilted backward when a rear collision occurs in the vehicle. In other words, an angle of the torso line t of the occupant m having sunk into the seatback 103 is erected.

Then, since the head of the occupant m is tilted backward until the head comes to into contact with the headrest (in FIG. 5(B), the head is tilted backward by the angle Δθa), a difference (θ1−θ0, in FIG. 5) between an initial angle (θ0, in FIG. 5(A)) formed by the torso line t and the headline h before the rear collision and a first angle (θ1, in FIG. 5(B)) formed by the torso line t and the headline h after the rear collision, i.e., a relative backward tilting angle is increased. Therefore, when the relative backward tilting angle is increased, it is not possible to sufficiently reduce the load that is applied to the neck of the occupant m by the shock of the rear collision.

SUMMARY OF THE INVENTION

Accordingly, the present invention has been made in view of the above circumstances. An aspect of the present invention provides a vehicle seat capable of sufficiently reducing a load that is applied to the neck of an occupant by shock resulting from a rear collision.

According to an illustrative embodiment of the present invention, there is provided a vehicle seat comprising: a back frame; and a bracket assembled to the back frame and configured to reduce a load applied to a neck of an occupant by shock of a rear collision when the rear collision occurs in a vehicle, wherein the bracket has an inclined surface that is substantially parallel with a torso line at a normal posture of a seatback.

According to the above configuration, it is possible to reduce the load that is applied to the neck of the occupant by the shock of the rear collision, similarly to the related art.

In addition, since the bracket has an inclined surface that is substantially parallel with a torso line at a normal posture of the seatback, it is possible to make the state, in which a torso line of the occupant having sunk into the seatback is tilted backward, further tilted backward than that in the related art. Accordingly, it is possible to reduce an angle difference (a relative backward tilting angle) between an angle formed by the torso line of the occupant and the headline before the rear collision and an angle formed by the torso line of the occupant and the headline after the rear collision. As the relative backward tilting angle is reduced, the load applied to the neck of the occupant is also decreased, so that it is possible to sufficiently reduce the load applied to the neck of the occupant by the shock of the rear collision.

DETAILED DESCRIPTION

Figure 1:
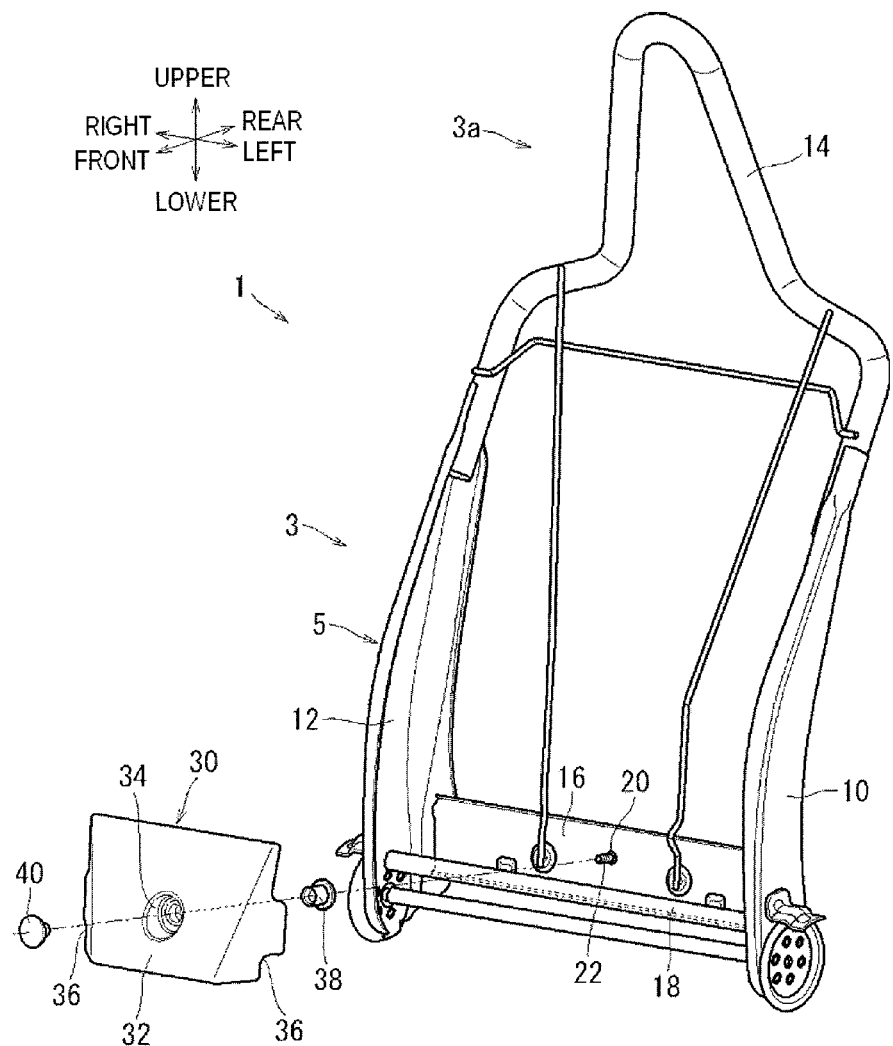
FIG. 1 is an exploded perspective view of a back frame of a vehicle seat according to an illustrative embodiment of the present invention.

Illustrative embodiments of the present invention will be described with reference to FIGS. 1 to 4. In the below descriptions, a front seat 1 is an example of a vehicle seat. In the descriptions, the upper, lower, front, rear, left and right respectively indicate the upper, lower, front, rear, left and right directions shown in the drawings, i.e., the upper, lower, front, rear, left and right directions based on the front seat 1.

Figure 2:
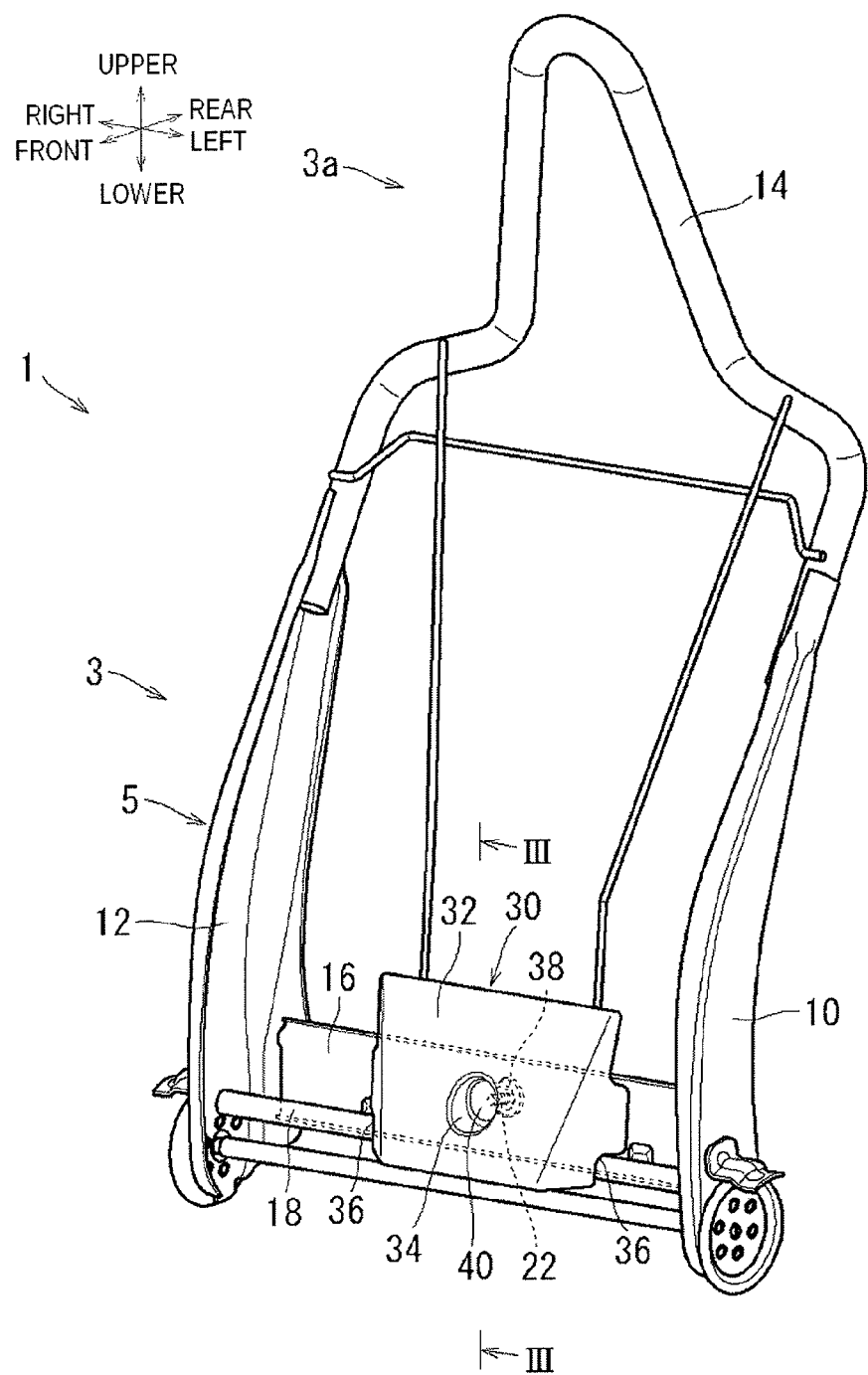
FIG. 2 is a perspective view showing an assembled state of the back frame of FIG. 1.
Figure 3:
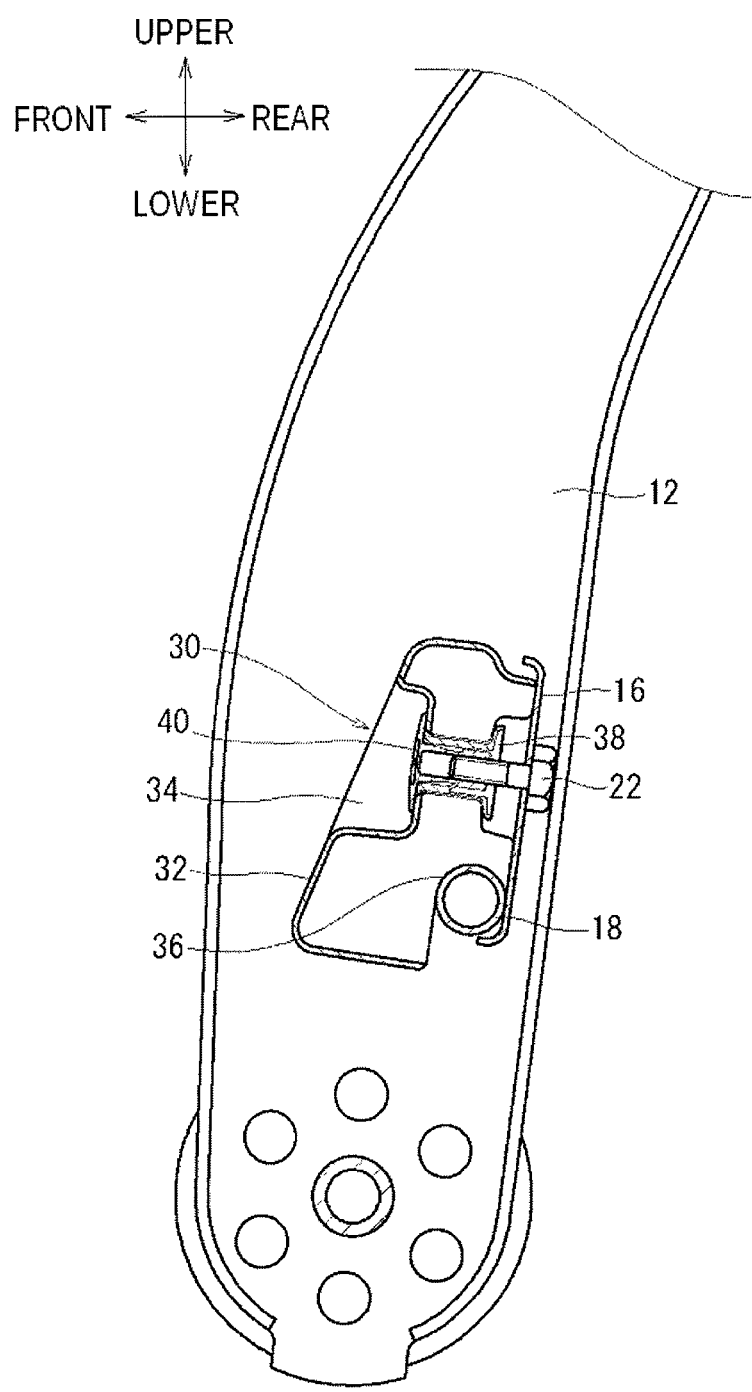
FIG. 3 is a sectional view taken along a line III-III of FIG. 2.

A schematic configuration of the front seat 1 will be described with reference to FIGS. 1 to 3. The front seat 1 includes a seat cushion (not shown) and a seatback 3 having a headrest 3a. The configuration of the seatback 3 will be described in detail. In FIGS. 1 to 3, a pad configuration and a cover configuration of the seatback 3 are omitted so as to easily appreciate an internal structure of the seatback 3.

The seatback 3 includes a back frame 5, a covering pad (not shown) that is assembled to the back frame 5 while enclosing the back frame 5, and a cover (not shown) that covers a surface of the covering pad.

The back frame 5 has a substantially rectangular frame shape that is configured by a pair of side frames 10, 12, an upper frame 14 that is welded to upper ends of the side frames 10, 12 so as to extend therebetween and a lower plate 16 (an example of a lower frame) that is welded to lower parts of the side frames 10, 12 so as to extend therebetween. The side frames 10, 12, the upper frame 14 and the lower frame 16 are made of metal members.

A rod 18 (an example of a rotation preventing member) is welded to a surface of the lower plate 16 along a longitudinal direction thereof. Therefore, even when the lower plate 16 is a thin plate, it is possible to increase the strength thereof. In addition, the lower plate 16 is formed with a through-hole 20 that penetrates the lower plate in a thickness direction thereof.

A bolt 22 is inserted into the through-hole 20 toward the surface from a backside of the lower plate 16 so as to assemble a bracket 30 that will be described later. The inserted bolt 22 is welded to the lower plate 16.

The bracket 30 is assembled to the surface of the lower plate 16. In the followings, the configuration of the bracket 30 and a sequence of assembling the bracket 30 to the surface of the lower plate 16 will be described.

First, the configuration of the bracket 30 will be described. The bracket 30 is provided to suppress a sinking amount of a waist part of an occupant M (not shown in FIGS. 1 to 3) into the seatback 3 due to shock of a rear collision when the rear collision occurs in a vehicle (not shown).

Figure 4:
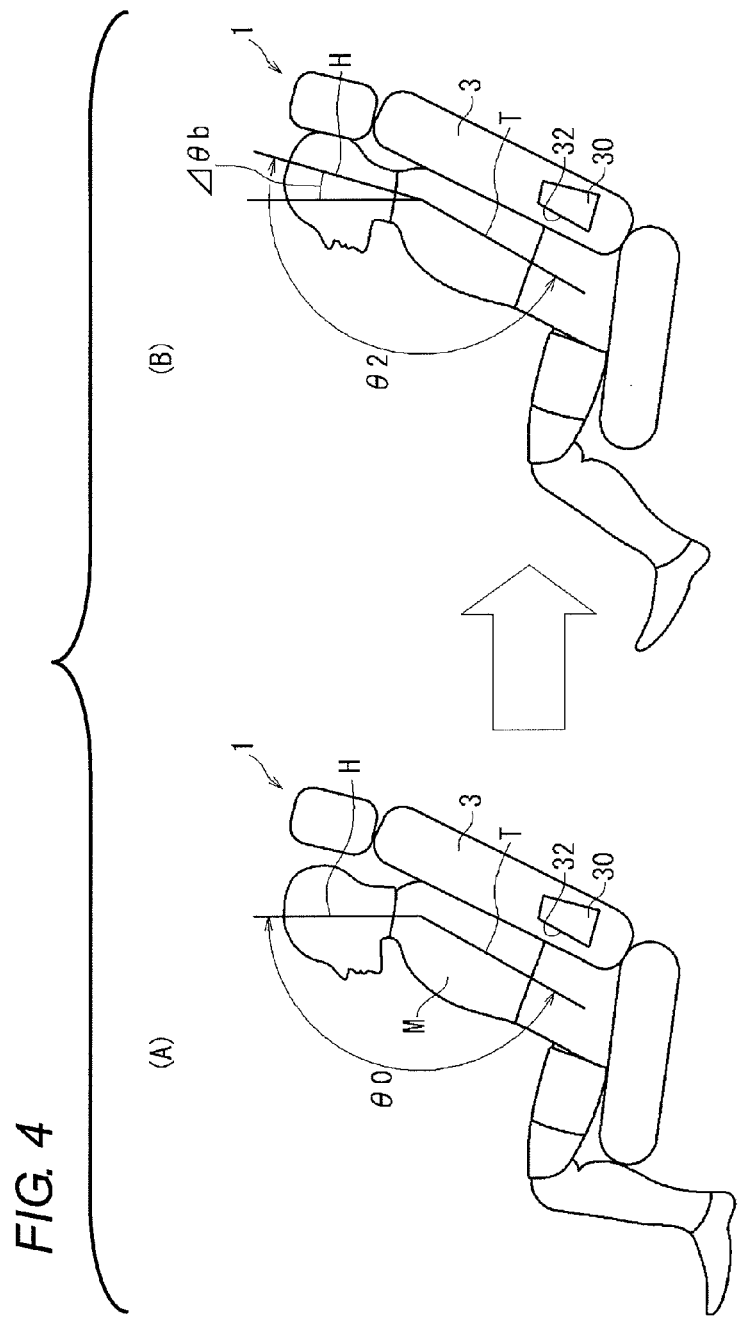
FIG. 4 illustrates an operation of the vehicle seat shown in FIG. 1, wherein (A) shows a state before a rear collision and (B) shows a state after the rear collision.

As shown in FIG. 4, the bracket 30 can suppress a torso line T of the occupant M having sunk into the seatback 3 from being tilted forward, similarly to the bracket 130 according to the related art. In other words, the bracket 30 can tilt the torso line T of the occupant M having sunk into the seatback 3 backward (refer to FIG. 4(B)). Therefore, it is possible to suppress an angle (Δθb, in FIG. 4(B)) by which the head of the occupant M having sunk into the seatback can be tilted backward. As a result, it is possible to reduce the load that is applied to the back of the neck of the occupant M by the shock of the rear collision.

The bracket 30 has an inclined surface 32 that is substantially parallel with a torso line T at a normal posture of the seatback 3 (the posture shown in FIGS. 1 to 3). In other words, the bracket 30 has the inclined surface 32 that is inclined to protrude further forward as proceeding from the upper to the lower, at the normal posture of the seatback 3. The inclined surface 32 is preferably within ±5° with respect to the torso line T at the normal posture of the seatback 3.

The normal posture of the seatback 3 is a design standard position that is determined from a comfort point of view although it is different depending on the types of vehicle. In addition, the torso line T at the normal posture of the seatback 3 is uniquely defined for the seatback 3 irrespective of the occupant M. It is noted that in this description, the torso line T (FIG. 4(A)) at the normal posture of the seatback coincides with the torso line T of the occupant M for ease of explanation. The inclined surface 32 is formed with an attachment hole 34 that penetrates the inclined surface in a thickness direction thereof so as to insert a base clip 38.

In addition, the bracket 30 is formed with notches 36, 36 at lower ends of left and right wall surfaces thereof. Therefore, as described below, when the bracket 30 is assembled to the lower plate 16, the notches 36, 36 are brought into contact with a periphery of the rod 18. In other words, an edge of the bracket 30 contacts the rod 18 connecting both side frames. The bracket 30 is integrally made of polypropylene (PP) foam beads, for example.

Next, a sequence of assembling the bracket 30 to the surface of the lower plate 16 will be described. First, the base clip 38 is pushed into the bolt 22. Then, the bracket 30 is attached to the lower plate 16 such that the pushed-in base clip 38 passes through the attachment hole 34 of the bracket 30.

Then, an insertion clip 40 is pushed into the base clip 38 until an engagement claw (not show) of the insertion clip 40 is engaged with a thread of the bolt 22. At this time, in order to prevent the bracket 30 from rattling in the lower plate 16, the insertion clip 40 is pushed into the base clip 38 such that the engagement claw of the insertion clip 40 is engaged to a base end of the thread of the bolt 22. Accordingly, the bracket 30 is fixed to the surface of the lower plate 16 at one point along the front-rear direction of the vehicle.

The front seat 1 is configured by the back frame 5 and the seatback 3 having the above-described pad and cover.

Figure 5:
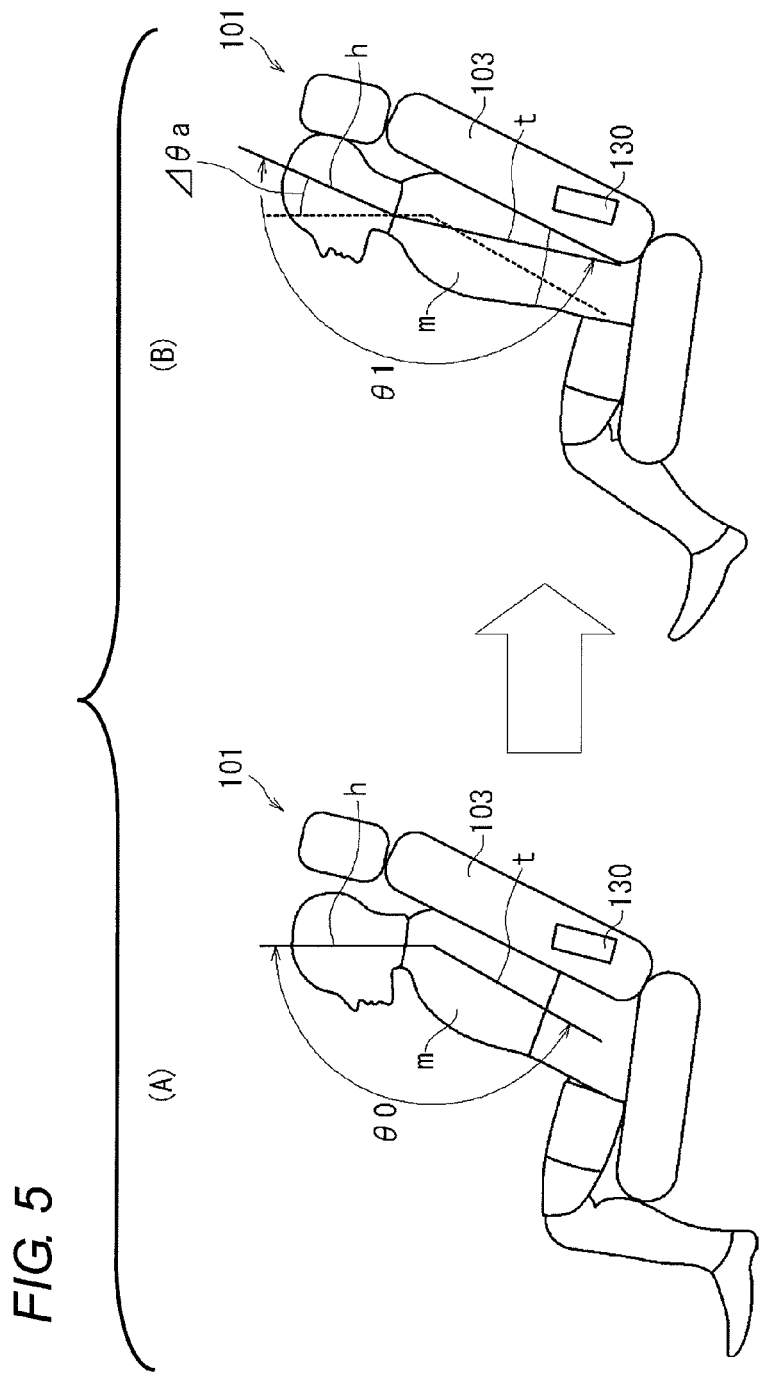
FIG. 5 illustrates an operation of a vehicle seat according to a related art, wherein (A) shows a state before a rear collision and (B) shows a state after the rear collision.

The operations of the front seat 1 configured as described above will be described with reference to FIGS. 4 and 5. When a rear collision occurs in a vehicle, the bracket 30 can suppress the torso line T of the occupant M having sunk into the seatback 3 from being tilted forward, similarly to the bracket 130 according to the related art. In other words, it is possible to keep the torso line T of the occupant M having sunk into the seatback 103 to be tilted backward (which is shown in FIG. 4(B)). Accordingly, it is possible to suppress an angle (Δθb in FIG. 4(B)) by which a head of the occupant M having sunk into the seatback can be tilted backward.

In the meantime, since the bracket 30 has the inclined surface 32, as shown in FIG. 4(B), it is possible to cause the torso line T of the occupant M having sunk into the seatback 3 to be further tilted backward as compared to the related art (which is shown in FIG. 5(B)). As can be clearly seen from the comparison of FIGS. 4(B) and 5(B), it is possible to enable the torso line T of the occupant M shown in FIG. 4(B) to be tilted further backward than the torso line t of FIG. 5(B).

Accordingly, it is possible to reduce an angle difference ($\theta 2-\theta 0$ in FIG. 4) between the initial angle ($\theta 0$ in FIG. 4(A)) formed by the torso line T of the occupant M and the headline H before the rear collision occurs in the vehicle, and a second angle ($\theta 2$ in FIG. 4(B)) formed by the torso line T of the occupant M and the headline H after the rear collision occurs in the vehicle. That is, it is possible to reduce a so called relative backward tilting angle.

According to the above-described front seat 1 according to the illustrative embodiment, the bracket 30 has the inclined surface 32. Therefore, as described above, it is possible to further reduce the relative backward tilting angle, compared to the related art. If the relative backward tilting angle is reduced, the load applied to the neck of the occupant M is also reduced, so that it is possible to sufficiently decrease the load applied to the neck of the occupant M by the shock of the rear collision.

In addition, according to the above configuration, when the bracket 30 is assembled to the surface of the lower plate 16 through the bolt 22, the base clip 38 and the insertion clip 40 (i.e., by the one-point fixing), the periphery of the rod 18 is contacted to both notches 36, 36 of the assembled bracket 30. Therefore, the assembled bracket 30 is not rotated about the axis of the bolt 22 with respect to the lower plate 16. Thus, even with the simple structure of the bolt 22, the base clip 38 and the insertion clip 40, it is possible to stably assemble the bracket 30 to the surface of the lower plate 16.

Additionally, according to the above configuration, the bracket 30 is integrally formed of polypropylene (PP) foam beads. Thus, it is possible to make the front seat 1 light without deteriorating the effect that the load applied to the neck of the occupant M by the shock of the rear collision can be sufficiently reduced.

While the present invention has been shown and described with reference to certain illustrative embodiments thereof, it will be understood by those skilled in the art that various changes in form and details may be made therein without departing from the spirit and scope of the invention as defined by the appended claims.

In the illustrative embodiment, the front seat 1 is exemplified as a vehicle seat. However, the present invention is not limited thereto. For example, an inventive concept of the present invention may be also applied to a second row-seat and a third-row seat.

In the illustrative embodiment, the lower plate is exemplified as a lower frame. In other words, the lower frame has a plate shape. However, the present invention is not limited thereto. For example, a rod shape may be also possible.

What is claimed is:

1. A vehicle seat comprising:
a back frame; and
a bracket assembled to the back frame and configured to reduce a load applied to a neck of an occupant by shock of a rear collision when the rear collision occurs in a vehicle,
wherein the bracket has an inclined surface that is substantially parallel with a torso line at a normal posture of a seatback,
wherein the back frame has a pair of side frames and a plate shape lower frame that extends between lower parts of the side frames in a seat-width direction, and
wherein the inclined surface of the bracket protrudes further forward with respect to the plate shape lower frame in a seat front-rear direction such that a lower end portion of the inclined surface of the bracket protrudes further forward in the seat front-rear direction than an upper end portion of the inclined surface of the bracket.

2. The vehicle seat according to claim 1,
wherein the bracket is fixed to the lower frame at one point, and an edge of the bracket contacts a rotation preventing member that extends in the seat-width direction and connects the side frames.

3. The vehicle seat according to claim 2,
wherein the bracket is made of polypropylene foam beads.

4. The vehicle seat according to claim 2,
wherein the rotation preventing member includes a rod connecting the side frames,
wherein the bracket is formed with notches at both ends in the seat-width direction, and
wherein the notches contact the rod at both ends of the bracket.

5. The vehicle seat according to claim 1,
wherein the bracket is fixed to the lower frame at one point.

6. The vehicle seat according to claim 5,
wherein the bracket is fixed to the lower frame at one point at a center of the lower frame in the seat-width direction.

7. The vehicle seat according to claim 5,
wherein the bracket is fixed to the lower frame with a bolt having threads and a clip having engagement claws to be engaged with the threads.

* * * * *